United States Patent [19]
Morgan

[11] Patent Number: 5,381,236
[45] Date of Patent: Jan. 10, 1995

[54] OPTICAL SENSOR FOR IMAGING AN OBJECT

[75] Inventor: Colin G. Morgan, Horspath, United Kingdom

[73] Assignee: Oxford Sensor Technology Limited, Summertown, United Kingdom

[21] Appl. No.: 104,084

[22] PCT Filed: Feb. 6, 1992

[86] PCT No.: PCT/GB92/00221

§ 371 Date: Aug. 10, 1993

§ 102(e) Date: Aug. 10, 1993

[22] Filed: Aug. 10, 1993

[30] Foreign Application Priority Data

Feb. 12, 1991 [GB] United Kingdom ............... 9102903

[51] Int. Cl.⁶ ............................................. G01B 11/24
[52] U.S. Cl. ............................ 356/376; 250/201.7; 250/561
[58] Field of Search .................. 356/376, 375, 4; 250/561, 201.7

[56] References Cited

U.S. PATENT DOCUMENTS 4,629,324 12/1986 Stern.
4,640,620 2/1987 Schmidt.
5,151,609 9/1992 Nakagawa et al. ............... 356/376

OTHER PUBLICATIONS

Applied Optics, vol. 26, No. 12, (1987), pp. 2416–2420; T. R. Corle E.A.: "Distance Measurements By Differential Confocal Optical Ranging".

Optical Engineering, vol. 29, No. 12, (1990), pp. 1439–1444; Jian Li E.A.: "Improved Fourier Transform Profilometry For The Automatic Measurement Of Three-Dimensional Object Shapes".

Technische Rundschau, vol. 79, No. 41, (1987), pp. 94–98; E. Senn: "Dreidimensionale Multipunktmessung Mit Strukturiertem Licht".

Applied Optics, vol. 29, No. 10, (1990), pp. 1474–1476; J. Dirickx E.A.: "Automatic Calibration Method For Phase Shift Shadow Moire Interferometry".

IEEE Transactions on Pattern Analysis and Machine, vol. 11, No. 11, (1989), pp. 1225–1228; Makoto Matsuki E.A.: "A Real-Time Sectional Image Measuring System Using Time Sequentially Coded Grating Method".

IBM Technical Disclosure Bulletin, vol. 16, No. 2, (1973), pp. 433–444; J. R. Malin: "Optical Micrometer".

Primary Examiner—F. L. Evans
Attorney, Agent, or Firm—Webb Ziesenheim Bruening Logsdon Orkin & Hanson

[57] ABSTRACT

The sensor comprises a structured light source (5, 6, 7) which is adjustable so as to interchange the positions of contrasting areas of the pattern it provides, a detector (1) which comprises an array of detector elements having dimensions matched to the pattern produced by the light source, an optical system (2, 8) for projecting a primary image of the light source pattern onto an object (3) that is to be sensed and for forming a secondary image on the detector (1) of the primary image thus formed on the object (3), positioning means (4) for moving at least part (2) of the optical system so as to vary the focussing of the primary image on the object (3) and processing means (12) for analyzing signals produced by the detector (1) in conjunction with information on the adjustment of the optical system (2, 8). The optical arrangement is 'confocal' so that, when the primary image is in focus on the object (3), the secondary image on the detector (1) is also in focus. The processing means (12) is arranged to analyse the images received by the detector (1) with the contrasting areas thereof in the interchanged positions to determine which parts of the images are in focus and hence determine the range of the corresponding parts of the object being viewed.

16 Claims, 5 Drawing Sheets

OPTICAL SENSOR FOR IMAGING AN OBJECT

TECHNICAL FIELD

This invention relates to an optical sensor and, more particularly, to a sensor used to sense the range of one or more parts of an object so as to form an image thereof.

BACKGROUND ART

A variety of different optical sensors are available for providing an image of objects within the field of view of the sensor. One such system known as a 'sweep focus ranger' uses a video camera with a single lens of very short depth of field to produce an image in which only a narrow interval of range in object space is in focus at any given time. By using a computer-controlled servo drive, the lens is positioned (or 'swept') with great accuracy over a series of positions so as to view different range 'slices' of an object. A three-dimensional image of the object is then built up from these 'slices'. The system detects which parts of the object are in focus by analysing the detected signal for high frequency components which are caused by features, such as edges or textured parts, which change rapidly across the scene. Because of this, the system is not suitable for imaging plain or smooth surfaces, such as a flat painted wall, which have no such features.

This limitation is common to all passive rangefinding techniques. One way to overcome the problem is to actively project a pattern of light onto the target objects which can then be observed by the sensor. If this pattern contains high spatial frequencies, then these features can be used by the sensor to estimate the range of otherwise plain surfaces. A particularly elegant way of projecting such a pattern is described in U.S. Pat. No. 4,629,324 by Robotic Vision Systems Inc.

In this prior art, the sensor detects those parts of the target object that are in focus by analysing the image for features that match the spatial frequencies present in the projected pattern. Various analysis techniques such as convolution and synchronous detection are described. However, such methods are potentially time consuming. In an extension of these ideas a further patent by the same company U.S. Pat. No. 4,640,620 describes a method which aims to overcome this problem by the use of a liquid crystal light valve device to convert the required high spatial frequency components present in the image into an amplitude variation that can be detected directly.

The present invention aims to provide a simpler solution to this problem.

DISCLOSURE OF INVENTION

According to one aspect of the present invention, there is provided an optical sensor comprising: a structured light source for producing a pattern of contrasting areas; a detector which comprises an array of detector elements having dimensions matched to the pattern produced by the light source; an optical system for projecting a primary image of the light source onto an object that is to be sensed and for forming a secondary image on the detector of the primary image thus formed on the object; adjustment means for adjusting at least part of the optical system so as to vary the focussing of the primary image on the object, the arrangement being such that when the primary image is in focus on the object, the secondary image on the detector is also in focus; and processing means for analysing signals produced by the detector in conjunction with information on the adjustment of the optical system, wherein the structured light source is adjustable so as to interchange the positions of contrasting areas of the pattern produced by the light source and in that the processing means is arranged to analyse the secondary images received by the detector elements with the contrasting areas in the interchanged positions to determine those parts of the secondary images which are in focus on the detector and thereby determine the range of corresponding parts of the object which are thus in focus.

According to another aspect of the invention, there is provided a method of determining the range of at least part of an object being viewed using an optical sensor comprising: a structured light source which produces a pattern of contrasting areas; a detector which comprises an array of detector elements having dimensions matched to the pattern produced by the light source; an optical system which projects a primary image of the light source onto an object that is to be sensed and forms a secondary image on the detector of the primary image thus formed on the object; adjustment means which adjusts at least part of the optical system so as to vary the focussing of the primary image on the object, the arrangement being such that when the primary image is in focus on the object, the secondary image on the detector is also in focus; and processing means which analyses signals produced by the detector in conjunction with information on the adjustment of the optical system, the method involving adjustment of the structured light source so as to interchange the positions of contrasting areas of the pattern produced by the light source and the processing means being arranged to analyse the secondary images received by the detector elements with the contrasting areas in the interchanged positions to determine those parts of the secondary images which are in focus on the detector and thereby determine the range of corresponding parts of the object which are thus in focus.

The invention thus transforms analysis of the image sensed by the detector into the temporal domain.

Preferred and optional features of the invention will be apparent from the following description and from the subsidiary claims of the specification.

BRIEF DESCRIPTION OF DRAWINGS

The invention will now be further described, merely by way of example, with reference to the accompanying drawings, in which.

BEST MODE OF CARRYING OUT THE INVENTION

The optical sensor described herein combines the concepts of a 'sweep focus ranger' of the type described above with the concept of an active confocal light source as described in U.S. Pat. No. 4,629,324 together with means to transform the depth information analysis into the temporal domain.

The term 'confocal' is used in this specification to describe an optical system arranged so that two images formed by the system are in focus at the same time. In most cases, this means that if the relevant optical paths are 'unfolded', the respective images or objects coincide with each other.

Figure 1:
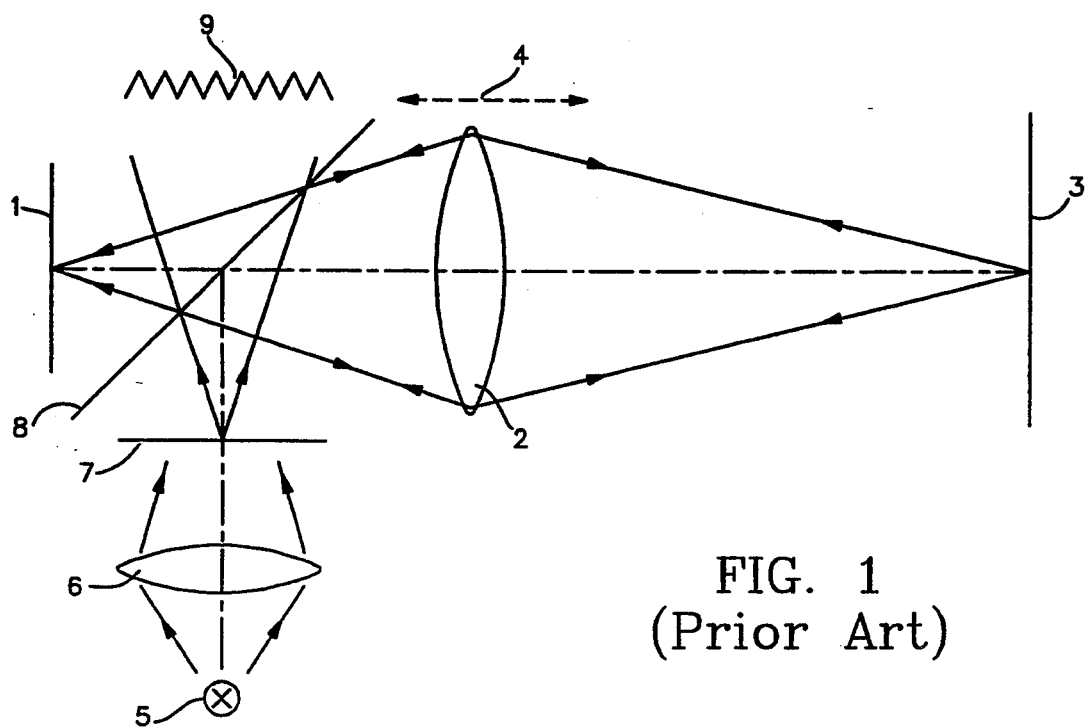
FIG. 1 illustrates the basic concept of an optical sensor such as that described in U.S. Pat. No. 4,629,324 and shows the main components and the optical pathways between them.

The basic concept of a sensor such as that described in U.S. Pat. No. 4,629,324 is illustrated in FIG. 1. The sensor comprises a detector 1 and a lens system 2 for focussing an image of an object 3 which is to be viewed onto the detector 1. Positioning means 4 are provided to adjust the position of the lens system 2 to focus different 'slices' of the object 3 on the detector 1. Thus far, the sensor corresponds to a conventional 'sweep focus sensor'. As described in U.S. Pat. No. 4,629,324, the sensor is also provided with a structured light source comprising a lamp 5, a projector lens 6 and a grid or spatial filter 7 together with a beam-splitter 8 which enables an image of the filter 7 to be projected through the lens system 2 onto the object 3. The filter 7 and detector 1 are accurately positioned so that when a primary image of the filter 7 is focussed by the lens system 2 onto the object 3, a secondary image of the primary image formed on the object 3 is also focussed by the lens system 2 onto the detector 1. This is achieved by positioning the detector 1 and filter 7 equidistant from the beam splitter 8 so the system is 'confocal'. An absorber 9 is also provided to help ensure that the portion of the beam from the filter 7 which passes through the beam splitter 8 is absorbed and is not reflected onto the detector 1.

The lens system 2 has a wide aperture with a very small depth of focus and in order to form an image of the object 3 the lens system 2 is successively positioned at hundreds of discrete, precalculated positions and the images received by the detector 1 for each position of the lens system 2 are analysed to detect those parts of the image which are in focus. When the images of the grid 7 on the object 3 and on the detector 1 are in focus, the distance between the lens system 2 and the parts of the object 3 which are in focus at that time can be calculated using the standard lens equation; which for a simple lens is:

$$1/f = 1/U + 1/V$$

where f is the focal length of the lens system 2, U is the object distance (i.e. the distance between the lens system 2 and the in focus parts of the object 3) and V is the image distance (i.e. the distance between the lens system 2 and the detector 1).

To enable areas of object which are in-focus to be detected, the images formed on the object 3 and detector 1 are preferably in the form of a uniform structured pattern with a high spatial frequency, i.e. having a small repeat distance, comprising contrasting areas, such as a series of light and dark bands. Such patterns can, for example, be provided by slots or square cut-outs in the filter 7. For such patterns, those parts of the image which are in focus on the object 3 being viewed produce a corresponding image on the detector 1 of light and dark bands whereas the out of focus parts of the image rapidly 'break-up' and so produce a more uniform illumination of the detector 1 which is also significantly less bright than the light areas of the parts of the image which are in focus.

The structured pattern should preferably have as high a spatial frequency as possible, although this is limited by the resolution of the lens system 2 and the size of the detector array, as the depth resolution is proportional to this spatial frequency.

Figure 2:
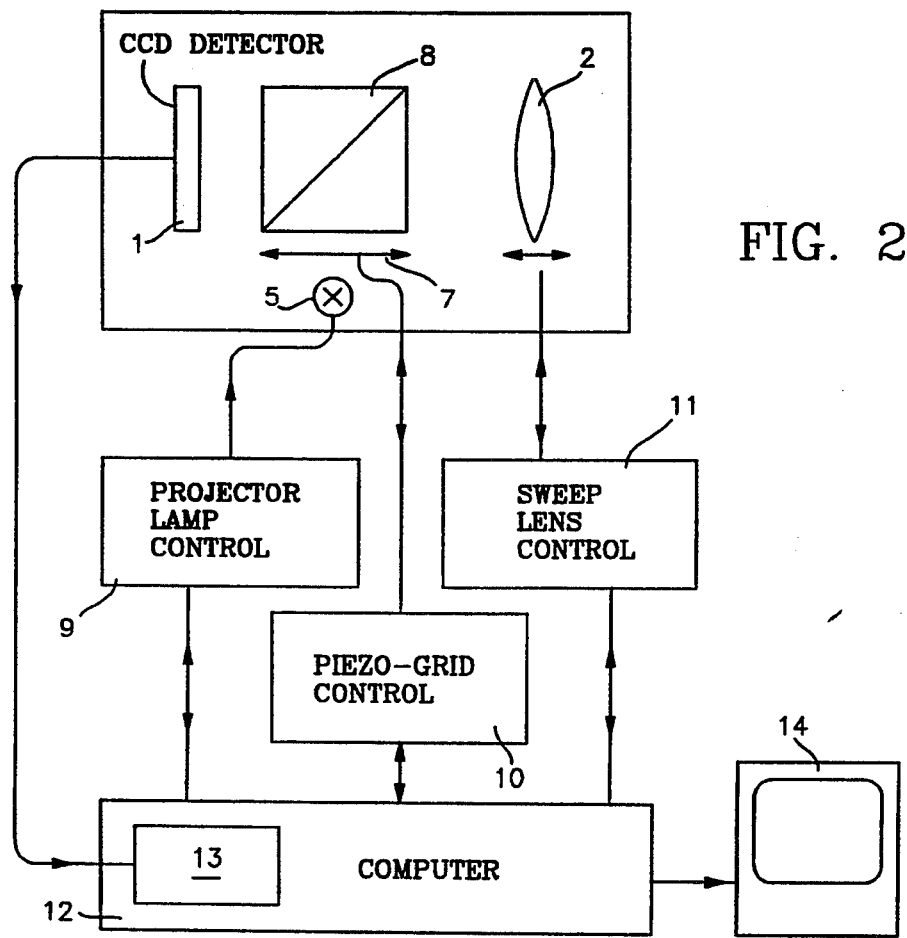
FIG. 2 shows a box diagram of an optical sensor of the type shown in FIG. 1 with a particular control unit and signal processing arrangement according to one embodiment of the present invention.

FIG. 2 is a box diagram of a sensor of the type shown in FIG. 1 together with control and processing units as used in an embodiment of the invention to be described. The light source 5 of the sensor is controlled by a projector lamp control unit 9, a piezo-electric grid control unit 10 is provided for moving the grid or filter 7 (for reasons to be discussed later) and adjustment of the lens system 2 is controlled by a sweep lens control unit 11. The control units 9, 10 and 11, together with the output of the CCD detector 1, are connected to a computer 12 provided with an image processor, frame grabber, frame stores (computer memory corresponding to the pixel array of the detector 1) and a digital signal processor (DSP) 13 for processing the signals received and providing appropriate instructions to the control units. The output of the signal processor may then be displayed on a monitor 14.

In the sensor described herein, the detector 1 comprises an array of detector elements or pixels such as charged coupled devices (CCD's) or charged injection devices (CID's). Such detectors are preferred over other TV type sensors because the precise nature of the detector geometry makes it possible to align the unfolded optical path of the structured image with the individual pixels of the detector array.

The grid or spatial filter 7 consists of a uniform structured pattern with a high spatial frequency i.e. having a small repeat distance, comprising contrasting areas, such as a series of light and dark bands or a chequerboard pattern. The spatial frequency of the grid pattern 7 should be matched to the pixel dimensions of the detector 1, i.e. the repeat distance of the pattern should be n pixels wide, where n is a small even integer e.g. two (which is the preferred repeat distance). The value of n will be limited by the resolution of the lens system 2.

If a chequer-board type pattern is used, the detector should be matched with the pattern in both dimensions, so for optimum resolution it should comprise an array of square rather than rectangular pixels as the lens system 2 will have the same resolving power in both the x and y dimensions. Also, the use of square pixels simplifies the analysis of data received by the detector.

The light and dark portion of the pattern should also be complementary so that added together they give a uniform intensity. The choice of pattern will depend on the resolution characteristics of the optical system used but should be chosen such that the pattern 'breaks up' as quickly and cleanly as possible as it goes out of focus. The pattern need not have a simple light/dark or clear/opaque structure. It could also comprise a pattern having smoothly changing (e.g. sinusoidal) opacity.

This would tend to reduce the higher frequency components of the pattern so that it 'breaks up' more smoothly as it moves out of focus.

In order to avoid edge effects in the image formed on the object 3 or detector 1, it is preferable for the grid pattern to comprise more repeat patterns than the CCd detector, i.e. for the image formed to be larger than the detector array 1.

One possible form of grid pattern 7 is that known as a 'Ronchi ruling resolution target' which comprises a pattern of parallel stripes which are alternatively clear and opaque. A good quality lens system 2 (such as that used in a camera) will typically be able to resolve a pattern having between 50 and 125 lines/mm in the image plane depending upon its aperture, and special lenses (such as those used in aerial-photography) would be even better. The resolution can also be further improved by limiting the wavelength band used, e.g. by using a laser or sodium lamp to illuminate the grid pattern 7. A typical CCD detector has pixels spaced at about 20 microns square so with two pixel widths, i.e. 40 microns, corresponding to the pattern repeat distance, this sets a resolution limit of 25 lines/mm. Finer devices are likely to become available in the future.

The number of repeats of the structured pattern across the area of the object being viewed should preferably be as high as possible for the lens system and detector array used. With a typical detector array of the type described above comprising a matrix of 512×512 pixels, the maximum number of repeats would be 256 across the image. Considerably higher repeat numbers can be achieved using a linear detector array (described further below).

The lower limit on the spatial frequency of the grid pattern is set by the minimum depth resolution required. As the grid pattern becomes coarser, the number of repeats of the pattern across the image is reduced and the quality of the image produced by the sensor is degraded. An image with less than, say 40 pattern repeats across it is clearly going to provide only very crude information about the object being sensed.

In the sensor described herein, the high spatial frequency component of the light source is converted into the temporal domain. As indicated in FIG. 2, positioning means may be provided for moving the grid pattern 7. This is used to move the grid 7 in its own plane by one half of the pattern repeat distance between each frame grab. This movement is typically very small, e.g. around 20 microns (where the pattern repeats every 2 pixels), and is preferably carried out using piezo-electric positioning means. The effect of this movement is that in one position of the grid the unfolded optical path of the grid pattern overlaps the detector pixels in such a way that half the pixels correspond to light areas and half to dark and when the grid is moved by one half repeat distance then the opposite situation exists for each pixel (the pattern of light and dark areas on the array of pixels corresponding to the pattern of the structured light source). Each pixel of the detector 1 is thus mapped to an area of the pattern produced by the light source which alternates between light and dark as the structured light source is moved. Pairs of images may then be captured in the first and second frame stores with the grid 7 in the two positions and the intensities (i1 and i2) of corresponding pixels in the two frame stores determined so the following functions can be produced for each pixel:

Brightness $\qquad I = i1 + i2$

High Pass Component $\qquad M = |i1 - i2|/I$

The sum of the intensities i1 and i2 is a measure of the brightness of that pixel and the difference a measure of the depth of modulation. Dividing the difference signal by the brightness gives a normalized measure of the high pass component, which is a measure of how 'in-focus' that pixel is. The sign of the term "i1-i2" will, of course, alternate from pixel to pixel depending whether i1 or i2 corresponds to a light area of the grid pattern.

Those parts of the image which are in focus on the object 3 and on the detector 1, produce a pattern of light and dark areas which alternate as the grid 7 is moved. One of the signals i2 and i2 will therefore be high (for a bright area) and one will be low (for a dark area). In contrast, for parts of the image which are not in focus on the detector 1, the intensities i1 and i2 will be similar to each other and lower than the intensity of an in focus bright area.

If the background illumination is significant, a correction can be applied by capturing an image with the light source switched off in a third frame store. The background intensity "i3" for each pixel can then be subtracted from the values i1 and i2 used in the above equations.

In order to avoid spurious, noisy data, it is desirable to impose a minimum threshold value on the signal 'I'. Where 'I' is very low, for example when looking at a black object or when the object is very distant, then that sample should be ignored (e.g. by setting M to zero or some such value).

The process of constructing a complete 3D surface map of an object being viewed may thus proceed as follows:

1) Clear the 3D surface model map file.
2) Set the lens sweep to the starting position.
3) For each lens sweep position three frames are captured into three frame stores as follows:
   1 = Illumination on, grid pattern in position 1
   2 = Illumination on, grid pattern in position 2
   3 = No Illumination
4) The DSP is now used to perform the following functions on the raw image data: for each pixel (or group of pixels) the functions I and M described above are constructed.
5) The background signal is then subtracted:
   i1:=i1−i3
   i2:=i2−i3
6) Construct mean intensity I into frame store 3:
   I=i3:=i1+i2
7) Construct modulation depth M if I exceeds threshold value into frame store 1:

IF i3 > min THEN
   $\qquad M = i1 := |i1 - i2|/i3 \qquad$ (or could use $I$ for $i3$)
   ELSE
   $\qquad M = i1 := 0$ 8) The function M can be displayed from frame store 1 on the monitor (this corresponds to the in-focus contours which are shown bright against a dark background).
9) Clean up this 'M' data:
   a) Check for pixel to pixel continuity.

b) Look for the local maxima positions, interpolating to sub-pixel positions, then convert to corresponding object coordinates.

c) Construct data chains describing the in-focus contour positions.

d) Compare these contours with the adjacent sweep position contours.

e) Add this sweep position contours to the 3D surface model map.

10) Proceed to next lens sweep position and repeat the above stages until a complete surface model map is constructed.

The intensity information signal 'I', which corresponds to the information obtained by a conventional sweep focus ranger as the average of i1 and i2 is effectively a uniform illumination signal (i.e. without a structured light source), is also helpful in interpreting the data. Displaying the signal 'I' on a monitor gives a normal TV style image of the scene except for the very small depth of focus inherent in the system. If desired, changing patterns of intensity found using standard edge detector methods can therefore be used to provide information on in-focus edges and textured areas of the object and this information can be added to that obtained from the 'M' signal (which is provided by the use of a structured light source).

The technique of temporal modulation has the advantage that as each pixel in the image is analysed independently, edges or textures present on the object do not interfere with the depth measurement (this may not be the case for techniques based upon spatial modulation). The technique can also be used with a chequer-board grid pattern instead of vertical or horizontal bands. Such a pattern would probably 'break-up' more effectively than the bands as the lens system 2 moves out of focus and would therefore be the preferred choice. It should be noted that the sensors described above use a structured light source of relatively high spatial frequency to enable the detector to detect accurately when the image is in focus and when it 'breaks-up' as it goes out of focus. This is in contrast with some known range finding systems which rely on detecting a shift between two halves of the image as it goes out of focus.

The calculations described above may be performed pixel by pixel in software or by using specialist digital signal processor (DSP) hardware at video frame rates. A display of the function M on a CRT would have the appearance of a dark screen with bright contours corresponding to the "in-focus" components of the object being viewed. As the focus of the lens system is swept, so these contours would move to show the in-focus parts of the object. From an analysis of these contours a 3-dimensional map of the object can be constructed.

A piezo-electric positioner can also be used on the detector 1 to increase the effective resolution in both the spatial and depth dimensions. To do this, the detector array is moved so as to effectively provide a smaller pixel dimension (a technique used in some high definition CCD cameras) and thus allow a finer grid pattern to be used.

The use of piezo-electric devices for the fine positioning of an article is well known, e.g. in the high definition CCD cameras mentioned above and in scanning tunnelling microscopes, are capable of very accurately positioning an article even down to atomic dimensions. As an alternative to using a piezo-electric positioner, other devices could be used such as a loudspeaker voice coil positioning mechanism.

Instead of moving part of the light source it is also possible to modulate the light source directly, e.g. by using:

1) a liquid crystal display (LCD) (e.g. of the type which can be used with some personal computers to project images onto an overhead projector)
2) a small cathode ray tube (CRT) to write the pattern directly
3) magneto optical modulation (i.e. the Faraday Effect) together with a polarized light.
4) a purpose made, interlaced, fibre optic light guide bundle with two alternating light sources.

Figure 3:
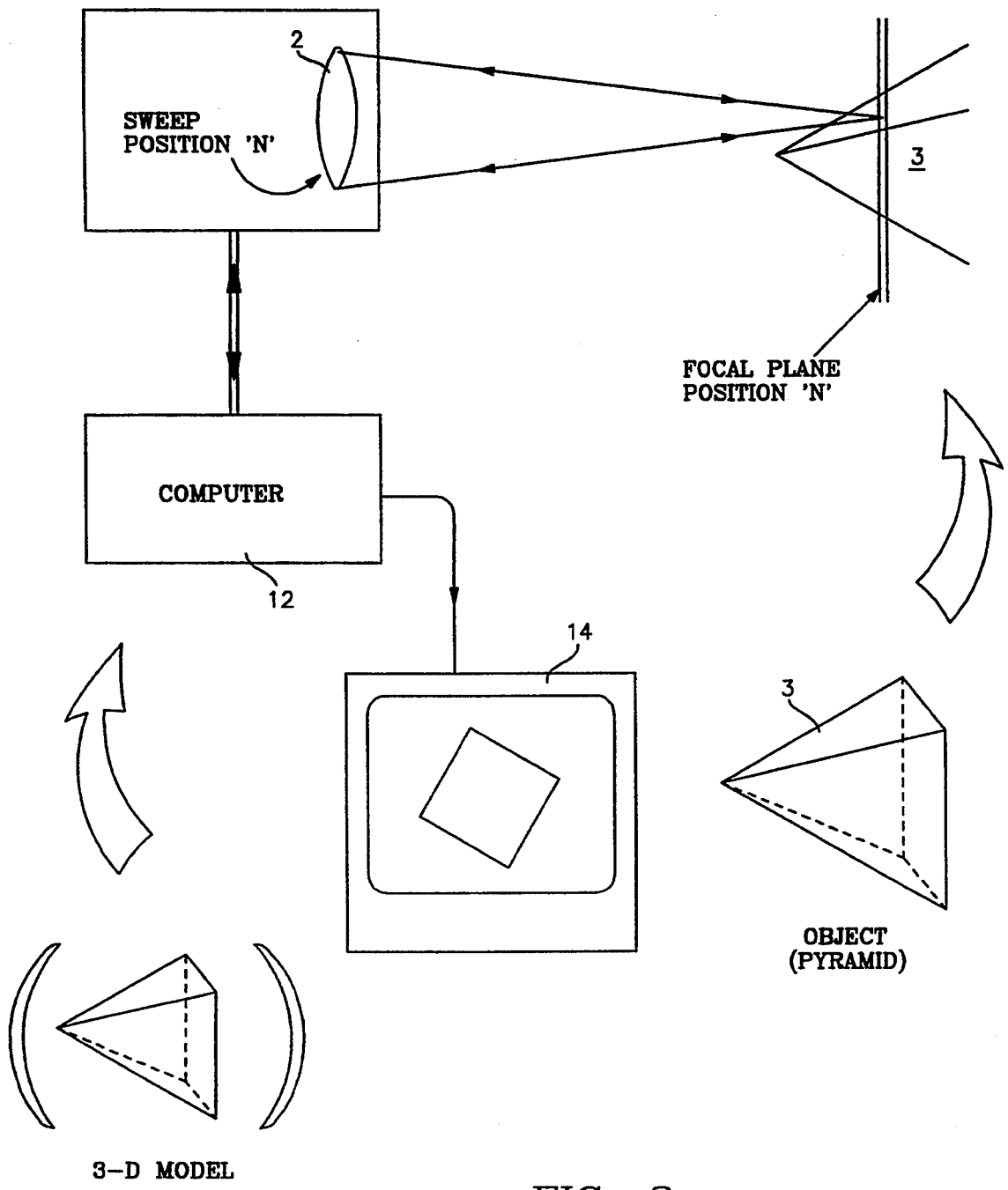
FIG. 3 illustrates how an image of an object being viewed by the type of system shown in FIGS. 1 and 2 can be built up and displayed.

FIG. 3 illustrates how the lens system 2 is adjusted to focus on successive planes of the object 3, and a 3-dimensional electronic image, or range map, of the object is built up from these 'slices' in the computer memory. The contours of the object 3 which are in focus for any particular position of the lens system 2 can be displayed on the monitor 14. Other images of the 3-dimensional model built up in this way can also be displayed using well known image display and processing techniques.

The optical sensor described above is an 'active' system (i.e. uses a light source to illuminate the object being viewed) rather than passive (i.e. relying on ambient light to illuminate the object). As it projects a pattern onto the object being viewed it is able to sense plain, un-textured surfaces, such as painted walls, floors, skin, etc., and is not restricted to edge or textured features like a conventional sweep focus ranger. The use of a pattern which is projected onto the object to be viewed and which is of a form which can be easily analysed to determine those parts which are in focus, thus provides significant advantages over a conventional 'sweep focus ranger'. In addition, since the outgoing projected beam is subject to the same focussing sweep as the incoming beam sensed by the detector 1, the projected pattern is only focussed on those parts of the object which are themselves in focus. This improves on the resolving capability of the conventional sweep focus ranger by effectively 'doubling up' the focussing action using both the detector 1 and the light source. The symmetry of the optical system means that when the object is in focus, the spatial frequency of the signal formed at the detector 1 will exactly equal that of the grid pattern 7.

The scale of measurements over which the type of sensor described above can be used ranges from the large, e.g. a few meters, down to the small, e.g. a few millimeters. It should also be possible to apply the same method to the very small, so effectively giving a 3D microscope, using relatively simple and inexpensive equipment.

In general, the technology is easier to apply at the smaller rather than the larger scale. This is because for sensors working on the small scale, the depth resolution is comparable with the spatial resolution, whereas on the larger scale the depth resolution falls off (which is to be expected as the effective triangulation angle of the lens system is reduced). Also, being an active system, the illumination required will increase as the square of the distance between the sensor and the object being viewed. Nevertheless, the system is well suited to use as a robot sensor covering a range up to several meters.

One of the problems with conventional microscopes is the "fuzzyness" that results from the very small depth of focus. To try to overcome this, CCD cameras have been attached to microscopes to capture images directly and software packages are now available which can process a series of captured images and perform a deconvolution operation to remove the fuzzyness. In this way images of a clarity comparable with those obtainable with a very much more expensive confocal scanning microscope are possible. The method described above of capturing and differencing pairs of frames, also enables clear cross-sectional images to be formed. This is in many ways easier than the software approach as the data contains height information in a much more accessible form. By scanning over height as described above (by moving the lens system 2) a 3D image of the sample can be built up. In the case of biological samples which are of a translucent nature, it may no longer be appropriate to form a simple surface profile. Instead, it may be more appropriate to form a full 3D "optical density" model to reflect this quality of the sample.

Another common microscopy technique that can be adapted for use with the sensor described above is fluorescence. This involves staining the sample with a fluorescent dye so that when illuminated with light of a particular wavelength, e.g. UV light, it will emit light of some other wavelength, say yellow. In this way it is possible to see which part of a sample has taken up the dye. If a light source of the appropriate wavelength is used and the detector arranged to respond only to the resulting fluorescence by the use of an appropriate filter, a 3D fluorescence model of the sample can be built up.

It will be appreciated that in such applications, the lens system 2 acts as the microscope objective lens.

Various optical arrangements can be used in the type of sensor described above and some of these are illustrated in FIGS. 4, 5 and 6.

Figure 4:
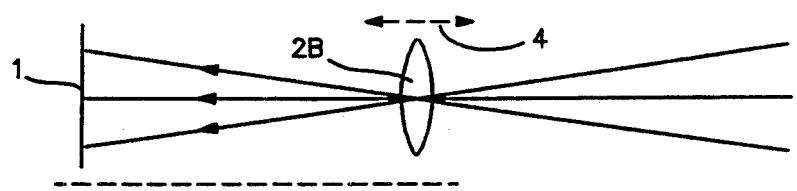
FIGS. 4, 5 and 6 show alternative optical arrangements which may be used in the sensor.
Figure 4:
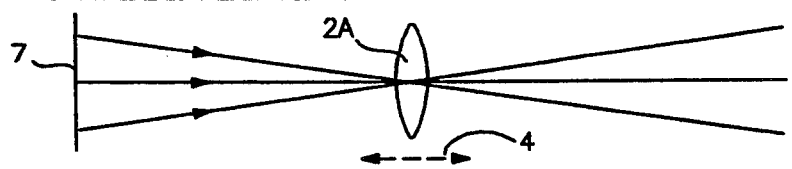

FIG. 4 shows a "side-by-side" arrangement in which separate lens systems 2A and 2B are used to focus a primary image of the grid 7 on the object 3 and to focus the secondary image thereof on the CCD detector 1. The system is again arranged so that when the primary image is in focus on the object 3, the secondary image on the detector is also in focus. This is achieved by making the lens systems 2A and 2B identical and positioning them side by side or one above the other (depending whether a horizontal or vertical pattern is used) so they are equi-distant from the projector grid 7 and detector 1, respectively. Movement of the two lens systems 2A and 2B would also be matched during the sweeping action. The two optical systems in this case are effectively combined by overlap on the object 3 of the area illuminated by the projector grid 7 and the area sensed by the detector 1.

Figure 5:
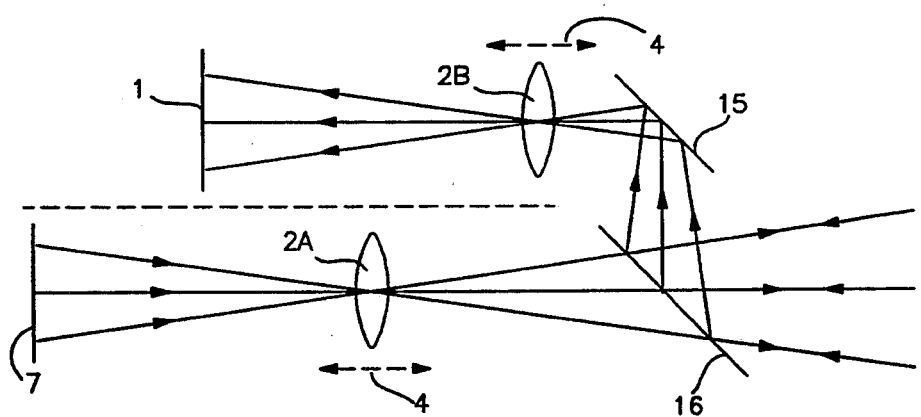

FIG. 5 shows an arrangement in which separate optical systems are combined using a mirror (or prism) 15 and a beam-splitter 16. Again, care is taken to ensure that the two lens systems 2A and 2B are identical are accurately positioned and their movements matched, to ensure the system is 'confocal'.

Figure 6:
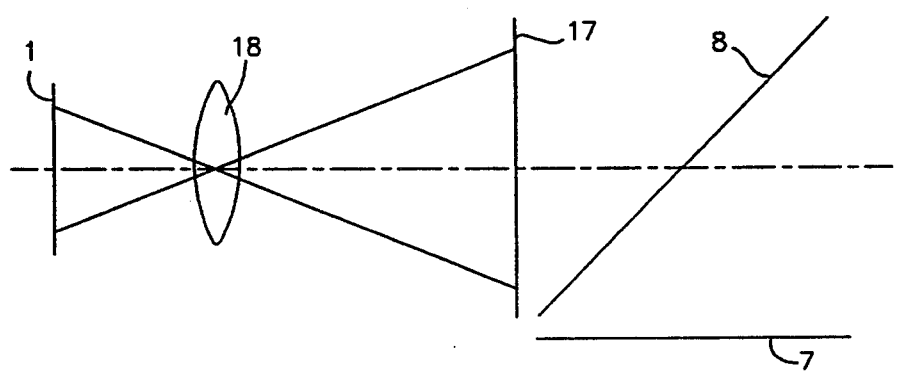

FIG. 6 shows part of an arrangement corresponding to that of FIG. 1 in which an intermediate imaging stage is inserted in the detector optics. The secondary image is first focussed on a translucent screen 17, e.g. of ground glass, by the optical system 2 and then focussed onto the detector 1 by a detector lens 18. The arrangement shown in FIG. 6 is particularly suited to long range sensors (e.g. more than 2 m) where it is desirable to use a larger lens (to give better depth resolution) than would normally be applicable for use with a CCD detector which is typically about 1 cm square.

If a structured light source having a pattern within a repeat distance greater than two pixels (i.e. $n>2$), the preferred solution is to use an additional imaging stage as in FIG. 6 to effectively reduce n to two.

However, larger CCD arrays are likely to become more readily available in the near future.

When the sensor is designed to work on the very small scale, it is easier to sweep not just the lens system 2 but the entire sensor relative to the object being viewed (as in a conventional microscope). As the lens to detector distance remains constant, the field of view angle and the magnification remain constant so each pixel of the detector 1 corresponds to a fixed x,y location in the object plane. Analysis of the image formed on the detector 1 is thus greatly simplified.

When the system is used as a microscope, it is preferable to use a mirror type of lens system, such as a Cassegrain mirror type microscope objective, as this offers a much larger aperture, and hence better depth resolution, than a conventional lens system.

In each of the arrangements described above, the positions of the light source and detector 1 may also be interchanged if desired.

Figure 7:
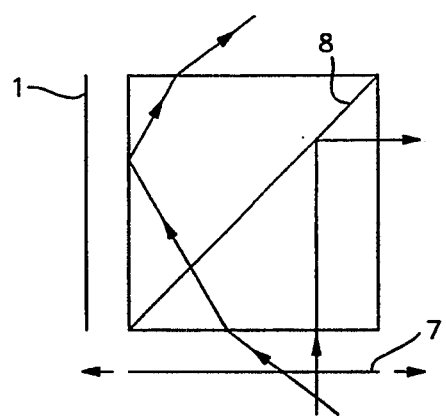
FIG. 7 shows an alternative form of beam splitter which may be used in the sensor.

The beam splitter 8 may be a simple half-silvered mirror of conventional design. However, a prism type of beam splitter, as shown in FIG. 7, is preferred to help reduce the amount of stray light reaching the detector 1. As shown in FIG. 7, total internal reflection prevents light from the grid pattern 7 impinging directly on the detector 1. Polarizing beam splitters combined with polarizing filters may also be used to reduce further the problems caused by stray light reaching the detector 1.

Figure 8A:
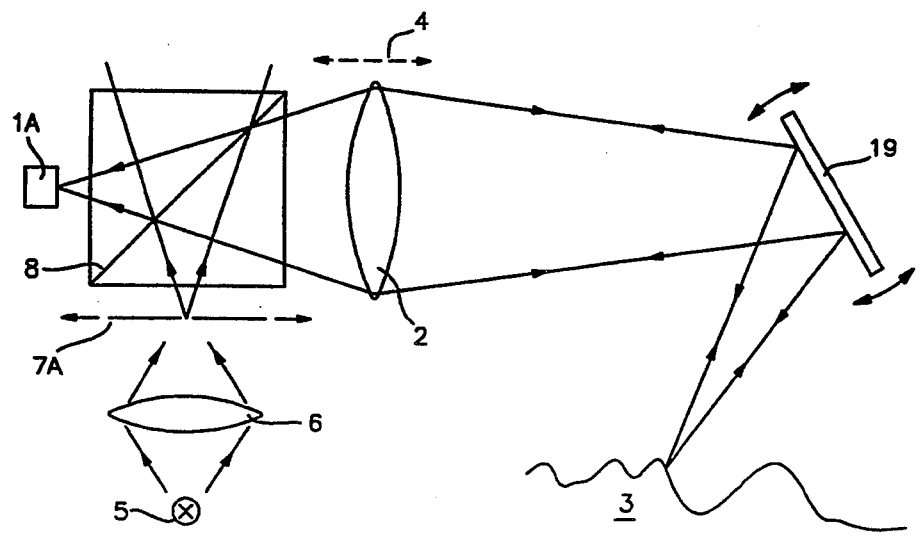
FIGS. 8(A) and 8(B) show a further embodiment of a sensor according to the invention.
Figure 8B:
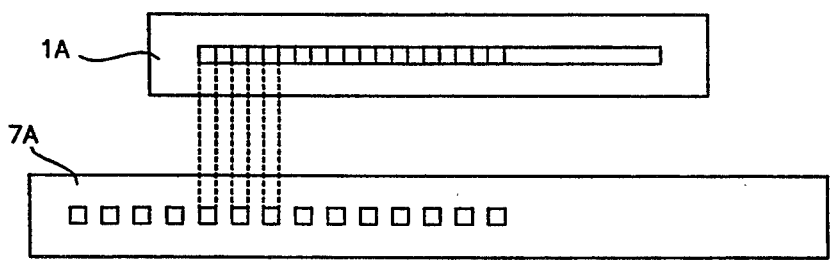

The embodiments described above use a 2-dimensional grid pattern and a 2-dimensional detector array 1. A similar arrangement can be used with a 1-dimensional grid pattern, i.e. a single line of alternate light and dark areas, and a 1-dimensional detector array, i.e. a single line of detector pixels. Such an arrangement is illustrated in FIGS. 8A and B. FIG. 8A shows a linear detector array 1A, a lens system 2, lamp 5, projector lens 6 and grid 7A and a beam splitter 8 arranged in a similar manner to the components of the embodiment shown in FIG. 1. An optional scanning mirror 19 (to be described further below) is also shown. FIG. 8B shows front views of the linear CCD detector array 1A and the linear grid pattern 7A comprising a line of light and dark areas which have dimensions corresponding to those of the pixels of the CCD detector 1A.

The 1-dimensional arrangement shown in FIG. 8 corresponds to a single row of data from a 2-dimensional sensor and gives a 2-dimensional cross-sectional measurement of the object 3 being viewed rather than a full 3-dimensional image. There are many applications where this is all that is required but a full 3-dimensional image can be obtained if a mechanism is used to scan the beam through an angle in order to give the extra dimension. In FIG. 8A, a scanning mirror 19 is shown performing this task although many other methods could be used. The scanning device 19 may either operate faster or slower than the sweep scan of the lens system 2 whichever is more convenient, i.e. either a complete lens system 2 focus sweep can be carried out for each scan position or a complete scan of the object is carried out for each position of the lens system 2 sweep.

Alternatively, the extra dimension can be obtained by moving the object being viewed. This arrangement is therefore suitable for situations where the object is being carried passed the sensor, e.g. by a conveyor belt.

A 1-dimensional system has a number of advantages:
1) Lower cost when only 2-dimensional information is required.
2) The much lower data rates from the 1-dimensional detector allows more rapid sweep scans (the full 3-dimensional system described above is limited by the video data readout speed, i.e. 50–60 Hz for standard video). A 1-dimensional detector can be read out at many thousands of scans/sec.
3) Less computing is required to process 2-dimensional data rather than 3-dimensional data.
4) Longer detector arrays are available in 1-dimensional form. Typical 2-dimensional detectors have about 512×512 pixels, whereas 1-dimensional, linear detectors having 4096 pixels are readily available.
5) Perhaps the most important advantage is that when the object being viewed is not in focus, the signal level at the detector 1A is much lower than for a 2-dimensional arrangement. This is because, the projected light falls over a large area, most of which is not viewed by the detector 1A. Hence, the further out of focus the object is, the smaller the observed signal will be. This helps simplify the data analysis as the fall off in intensity is proportional to the "out-of-focus" distance (as well as the normal factors). This is in contrast to the 2-dimensional detector arrangement in which the average light level remains much the same, and simply falls off with the distance between the sensor and the object according to the normal inverse square law.

A 1-dimensional version of the sensor is therefore suitable for use in sensing:
1) Logs in a saw mill, e.g. in deciding the most economic way to cut each log.
2) Extrusions, e.g. for checking the cross-sections of extruded metal, rubber or plastics articles or processed food products.
3) Food, e.g. for measuring the size of items of fruit, fish etc.
4) Objects carried by conveyors, e.g. for identifying objects or their position and orientation.

Figure 9A:
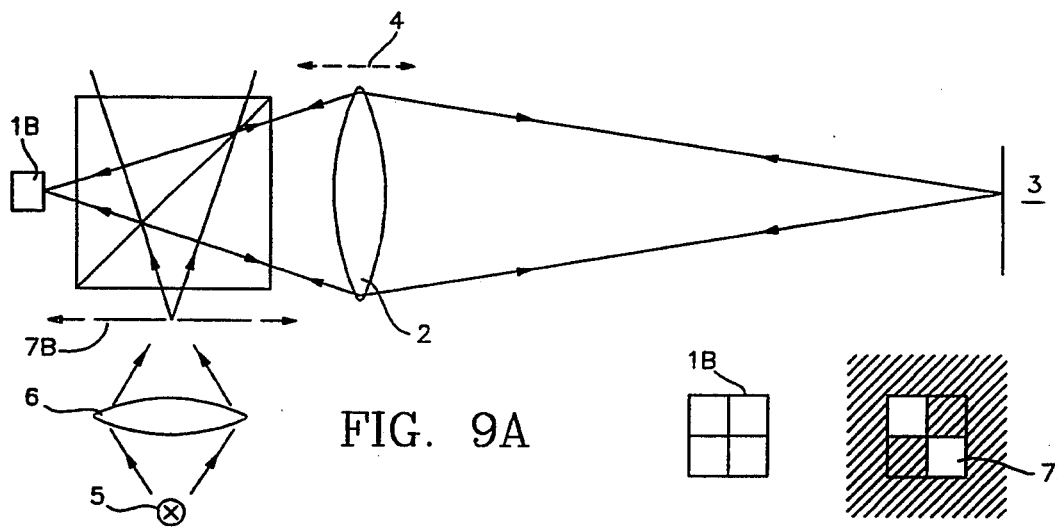
FIGS. 9(A) and 9(B) show another embodiment of a sensor according to the invention.
Figure 9B:
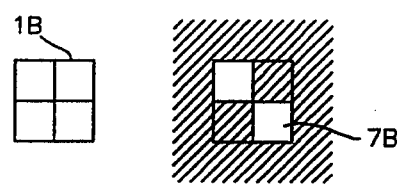

In another extension of the principle described above, the grid pattern and detector of the sensor may each be further reduced to a 'structured point'. In practice, this can be provided by a small grid pattern, e.g. in the form of a two-by-two chequer-board pattern 7B and a small detector, e.g. in the form of a quadrant detector 1B, as shown in FIGS. 9A and 9B. Alternatively, a two element detector and corresponding two element grid pattern may be used. The signals from such a detector are processed as if forming a single pixel of information. It will be appreciated that the optical arrangement of such a sensor is similar to that of a scanning confocal microscope but with the addition of a structured light source and detector rather than a simple point.

In its simplest form, this form of sensor acts as a 1D range fin As in the 1-dimensional detector case described above, extra dimensions can be obtained by using scanning mechanisms to deflect the beam across the object of interest and/or by moving the object past the sensor, e.g. on a conveyor. A double galvanometer scanner could, for example, be used to give a full 3-dimensional image or a single galvanometer scanner to give a 2-dimensional cross-sectional image.

With temporal modulation the illuminated pair of grid elements is alternated between observations. However, the data rates possible using piezo-electric positioning means would be too slow to exploit the sampling rates of the detector so other means should preferably be used to alternate the light source, such as:
1) a Faraday effect screen and projection optics.
2) a pair of matched laser diodes feeding light into pairs of fibre optics which are connected to opposite pairs of the quadrant.
3) using four matched light sources, e.g. laser diodes, arranged in a quadrant and connected together in opposite pairs with an optical system to focus the light onto a smaller quadrant grid mask.
4) using an acousto-optic modulator to deflect a laser beam between the sections of the grid pattern.

With this form of sensor, the mean illumination level remains constant and the AC synchronous component of the signal is detected to indicate when the image is in focus (as the opposite pairs of quadrants will be alternately bright and dark). The out of focus components will simply provide a level DC signal (as all four quadrants receive similar signals for both states of the illumination grid). The electronics is arranged to detect the difference in signals received by opposite pairs of quadrant in synchrony with the changing light source.

With this form of sensor, all the projected light has to come from the small, structured light source, so the most efficient arrangement is to use a laser as the light source. Also, available quadrant detectors may be larger than required, so an intermediate imaging stage may be required to match the size of detector with the grid pattern.

As with the 1-dimensional sensor described above, the intensity level falls off rapidly when the object is out of focus. In this case, however, the fall off is very much faster as (in addition to the normal factors) the fall off is approximately proportional to the square of the "out-of-focus" distance (as similarly occurs in a scanning confocal microscope).

This provides the possibility of using the sensor for imaging in difficult situations, for example through fog, smoke or in cloudy water. This is because:
1) Each small area of the object is looked at in turn. (Illumination of the entire object would result in 'fogging out' the entire image in the same way as using full beam headlights of a car in fog can reduce visibility due to an increase in the amount of scattered light).
2) The intensity of the unwanted scattered light from out-of-focus regions of the object is kept to a minimum by the fall-off being proportional to the square of the 'out-of-focus' distance as described above.
3) The scattered light that does reach the detector will be out-of-focus and so effect all four quadrants equally. This contributes to 'I' (the mean signal) but contributes very little to the difference term 'M'.
4) The synchronous detection scheme described above further distinguishes spurious light scattered from the fog and any background illumination from the genuine signal reflected from an in-focus object.

As with the 1-dimensional version described above, whether the lens focus sweep is fast and the image scanning slow or vice-versa is a matter of convenience. With an intelligent system, a particular sample can be terminated when the in-focus position has been found and it can then proceed to the next position, using the current range information as the starting guess for the next element, and so on.

Figure 10:
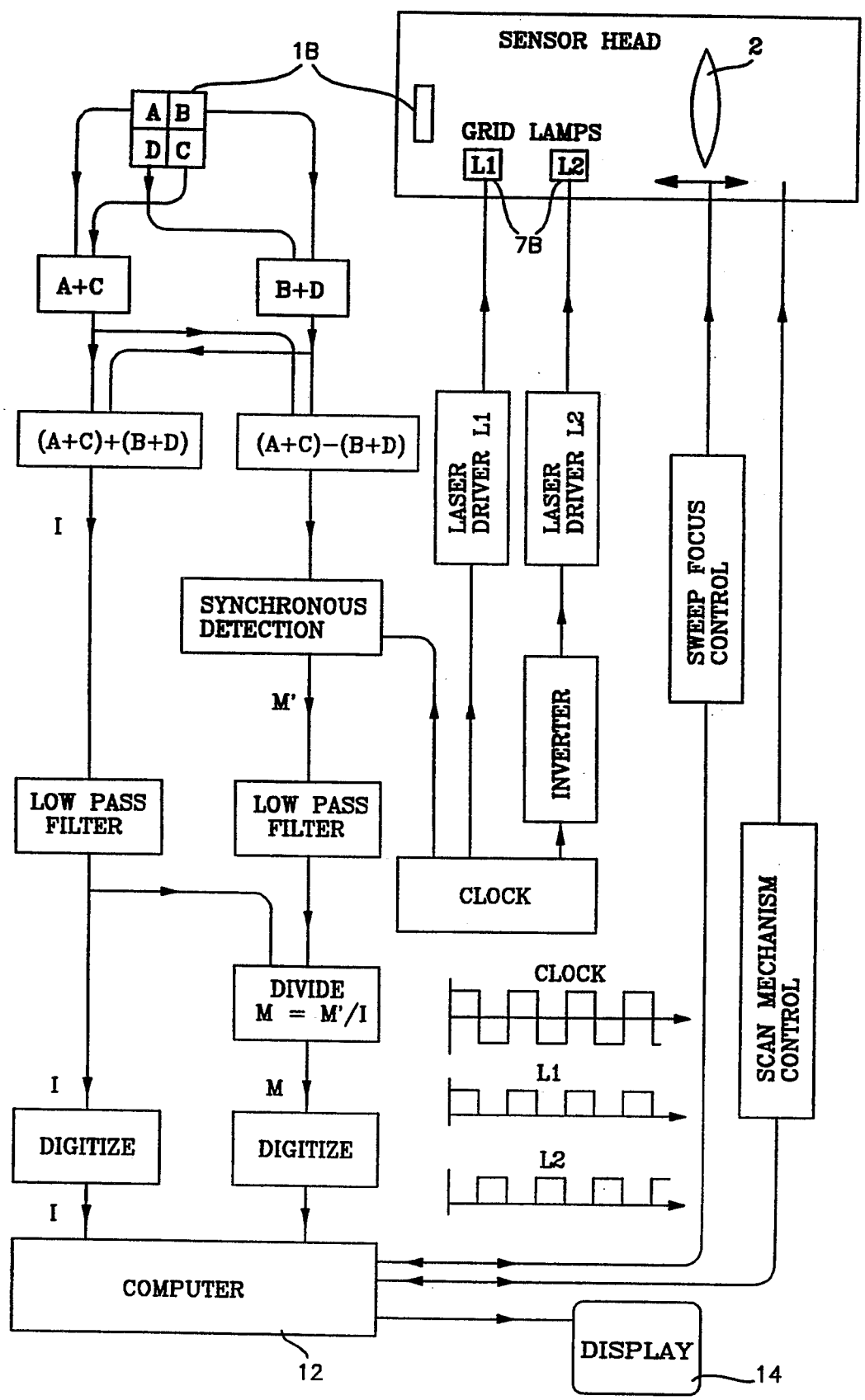
FIG. 10 shows a box diagram of a control unit and a signal processor which may be used with the embodiment shown in FIG. 9.

FIG. 10 shows the overall block structure for the embodiment shown in FIG. 9 having a simple quadrant detector and grid pattern. This system assumes that the quadrant light source is constructed using two matched laser diodes connected to pairs of fibre optics arranged in a quadrant pattern that matches the detector. A clock signal is used to synchronize the activity of the light sources and detection electronics. The light sources are illuminated alternately in such a way that the average light intensity remains constant. The outputs from the four quadrants A,B,C,D of the detector are amplified and combined to form the following terms.

Mean Intensity $I' = (A + C) + (B + D)$
Modulation depth $M' = (A + C) - (B + D)$ This modulation depth signals $M'$ is then passed through a standard synchronous detection circuit. The signal $M'$ is multiplied by plus or minus one depending upon the phase of the clock. The output $M'$ and $I'$ then pass through a low pass filter and a divider to give a signal M that corresponds to a measure of the 'in-focus' signal. The signals M and I are then digitized and sent to the computer.

Clearly the ordering of the above operations could be changed with no net difference to the result. For example, the division could be performed before or after the low pass filtering. The division could also be performed digitally after the analog to digital conversion (ADC) stage.

If necessary, the signal M may be integrated to give a better signal to noise ratio. A test will also be required to reject measurements where I is very low.

As discussed above, the characteristics of this sensor are such that the mean intensity I rapidly drops away if the sweep position is not close to the in-focus position. This fact can be used to skip rapidly over non-useful data.

The net effect is that only the temporally modulated signal corresponding to the in-focus grid pattern is detected. The lens sweep position corresponding to the maximum M value can thus be determined and hence the range of the object. By combining this procedure with a beam scanning mechanism, 2-dimensional or 3-dimensional range maps can be constructed.

The projection of a structured image onto the object which is to be viewed, together with the use of a detector able to sense the structure of the image, provides the advantages discussed above and enables the resultant image received by the detector 1B to be quickly and reliably analysed in the manner described to provide the required information. In addition, the use of this form of image and detector, enables a system with sufficient performance for a wide variety of applications to be provided using relatively simple and inexpensive apparatus. In all the arrangements described, temporal modulation (in which the grid pattern is moved half a repeat distance or the light and dark portions of the image are alternated between observations) is used as previously described to simplify the analysis of the signals received by the detector.

It will be appreciated that shifting the signal analysis into the temporal domain provides significant advantages over prior art techniques. The analysis is made a lot simpler so allowing the signals to be analysed more quickly so a greater amount of image information can be obtained within a given time. Individual pixels of the detector can also be analysed independently of each other.

The performance of the sensors described above will depend critically upon the characteristics of the lens system 2. Depth resolution improves proportionally to the aperture of the lens and the larger the aperture of the lens the better. Depth resolution also requires a lens of high resolving power. One way to improve resolution is to restrict the spectral bandwidth (to minimize chromatic aberration) with filters or by choice of light source e.g. laser diodes. A filter would then be used in front of the detector 1 to match the light source in order to cut out unwanted background light.

The lens system 2 may simply comprise a fast, high quality camera lens which has the advantage of being relatively inexpensive.

A single element large aperture aspheric lens may also be used. This has minimal spherical aberrations and would give good resolution if used over a narrow spectra bandwidth.

A zoom lens may also be used. A wide angle view could then be taken, followed by a telephoto close-up of areas of interest to give a higher resolution. A disadvantage of most zoom lenses is their restricted aperture which limits the depth resolution possible. The large number of optical surfaces within the lens system also tend to lead to problems with stray light.

A mirror lens may be the preferred option for larger scale ranging as conventional lenses become too heavy and cumbersome. A camera mirror lens is compact and its Cassegrain geometry offers a triangulation diameter greater than its aperture number and so should provide better depth resolution.

A variable focus lens system may also be used. One problem with a normal lens system is that the magnification changes during the sweep of the lens (as the detector to lens distance changes). This means that it is not possible to associate a particular pixel with a direction in space, and the same pixel can come into focus more than once during the lens sweep (at least in principle, particularly for those pixels towards the edge of the detector). By using a variable focal length lens system such as a zoom lens, we can in principle perform the sweep in focusing distance and at the same time compensate by changing the focal length such that the net magnification, i.e. the field of view, remains constant. With this arrangement, it becomes possible to associate each pixel with a direction vector in space which can simplify the analysis task of building the 3D model of the object.

Another alternative is to change the radii of curvature of the lens to adjust the focus. This can be done, for example, with a flexible liquid filled lens, in which the internal pressure controls the curvature of the lens, in combination with a conventional lens. With this type of lens, the optical components remain in a fixed position during the sweep and the change in focus is achieved by changing the curvature and hence the focal length of the lens. The range in lens power required for the sweep is relatively small so the liquid filled lens need only be relatively weak compared to the conventional lens which provides most of the power of the lens system. Other types of variable focus lens systems could also be used.

Ideally the lens system should have a flat image plane, but in practice that may not be the case. The circular symmetry of the lens system should, however, imply a similar symmetry to the image plane position. A calibration procedure can be used to establish the relationship between the lens sweep position and the in focus position as a function of the off-axis distance. From this a calibration table can be constructed relating the target distance to sweep position and off-axis distance. Suitable functions can then be fitted and used in converting observations into range. In addition, if a suitable calibration pattern is used that can be read by the detector, e.g. a piece of graph paper, the scaling in the image plane can be automatically determined and fitted in a similar manner.

A possible problem with the optical sensors described above is the likelihood of stray light from the light source entering the detector 1. Such stray light will not be in focus, but will have the effect of reducing the contrast of the images and thus degrading performance. This problem becomes worse as the scale of the ranging increases as a larger scale instrument will require a brighter light source and will receive back less light from the object being viewed. In order to minimize this problem a number of strategies are possible:

1) Use a high quality lens system with multi-coated surfaces.
2) Match the field of view (FoV) of the light source to the needs of the lens system.
3) Use crossed polarizing filter over the grid pattern and the detector.
4) Use a polarizing beam-splitter with the above.
5) Use the minimum number of optical surfaces (a single element aspheric lens may be useful).
6) Make sure the unwanted half of the beam that emerges from the beam-splitter is well absorbed.

FIGS. 4 and 5 show another approach to the stray light problem in the case of large scale ranging where the single lens is replaced by a matched pair of separate lens for the light source and detector. In FIG. 4, the two lenses are shown mounted one above the other and with their axes parallel. In this case, a vertical grid pattern must be used because of parallax and the lenses should have a flat image plane so that the vertical bands align with the pixel array of the detector. An intermediate solution is for the two beams to be combined externally rather than internally as shown in FIG. 5. As less optical surfaces are involved, the stray light problem will be less acute. In this second example, the preferred chequerboard grid pattern can again be used.

The other unwanted source of illumination is background or ambient light. This becomes progressively worse as the scale of the ranging increases and will determine the upper limit of usefulness of the sensor. The "active" projected light source must therefore be dominant. A number of precautions can be applied to minimize this problem.

1) Use a bright, narrow spectra-bandwidth light source with matching filter over the detector.
2) Use a stroboscopic light source with synchronized short exposure frame-grab.
3) Capture images with no internal light source and subtract this background signal from the active images.

The sensor relies on the triangulation angle afforded by the finite diameter of the lens system 2. Light is collected from the object 3 over the full area of the lens system 2 and the larger this area the smaller the depth of focus. In the same way, it is important that the outgoing light from the sensor also makes full use of the total lens area available in order to project a pattern with a short depth of field onto the object 3. The optics of the light source should therefore be designed so that from each point on the grid a cone of light is directed towards the lens so as to cover its full area. This cone of light should be of a uniform intensity (or even perhaps biased towards the edge of the lens which contributes the greater triangulation angle).

Optical sensors of the type described herein have a wide range of possible applications. These include:

1) Autonomous guided vehicles (AGU's), i.e. free ranging robotic vehicles which use their own sensors to plan their motion.
2) Medical imaging, e.g. facial mapping for planning plastic surgery or mapping of a patient's back to investigate spinal disorders.
3) Dentistry, e.g. mapping dental cavities for automatic machining of ceramic filling inserts.
4) Inspection of products such as printed circuit boards, e.g. checking components are in place etc.
5) Industrial gauging, e.g. measuring components such as vehicle bodies automatically.

INDUSTRIAL APPLICABILITY

It will be appreciated from the above that the sensor described herein can be used in a wide variety of industries and a wide variety of applications.

I claim:

1. An optical sensor comprising:
   a structured light source for producing a pattern of contrasting areas;
   a detector which comprises an array of detector elements having dimensions matched to the pattern produced by the light source;
   an optical system for projecting a primary image of the light source onto an object that is to be sensed and for forming a secondary image on the detector of the primary image thus formed on the object;
   adjustment means for adjusting at least part of the optical system to vary the focussing of the primary image on the object, such that when the primary image is in focus on the object, the secondary image on the detector is also in focus; and
   processing means for analyzing signals produced by the detector in conjunction with information on the adjustment of the optical system;
   wherein the structured light source is adjustable to interchange at least two positions of contrasting areas of the pattern produced by the light source and in that the processing means is arranged to analyze the secondary images received by the detector elements with the contrasting areas in the interchanged positions to determine those parts of the secondary images which are in focus on the detector and thereby determine the range of corresponding parts of the object which are thus in focus.

2. An optical sensor as claimed in claim 1 in which the structured light source is arranged to produce a pattern of light and dark areas and adjustment means are provided for moving the structured light source to interchange the positions of the light and dark areas.

3. An optical sensor as claimed in claim 1 in which the structured light source comprises a plurality of elements arranged in a pattern which can be alternately switched on and off to interchange the positions of contrasting areas of the primary and secondary images formed on the object and on the detector.

4. An optical sensor as claimed in claim 1 in which the structured light source comprises a regular pattern having a repeat distance which is n times the dimensions of the detector elements, where n is an even integer.

5. An optical sensor as claimed in claim 1 in which the processing means is arranged to analyze signals representing two intensities of illumination received by each detector element when the image thereon is in the two respective positions and to determine those areas of the detector for which the difference between the two signals is relatively high and thus indicate the parts of the secondary image which are in focus on the detector.

6. An optical sensor as claimed in claim 1 in which the detector comprises a 2-dimensional array of detector elements and the structured light source comprises a corresponding 2-dimensional pattern of contrasting areas and in which the processing means is arranged to form a 2-dimensional image of those parts of the object which are in focus for a given focussing adjustment of the optical system and to build up a 3-dimensional model of the object from a plurality of said 2-dimensional images as the focussing adjustment of the optical system is varied.

7. An optical sensor as claimed in claim 1 in which the detector comprises a linear array of detector elements and the structured light source comprises a corresponding linear pattern of light and dark areas and in which the processing means is arranged to build up a 2-dimensional image of a cross-section of the object being sensed by detecting those parts of the secondary image which are in focus on the detector as the focussing adjustment of the optical system is varied.

8. An optical sensor as claimed in claim 1 in which the detector comprises a structured point detector and the structured light source comprises a structured point source and in which the processing means is arranged to determine the range of an object being sensed by detecting when the structure of the image formed on the detector, as the focussing adjustment of the optical system is varied, corresponds to the pattern of the structured light source.

9. An optical sensor as claimed in claim 7 including scanning means for scanning the image produced by the light source relative to the object being sensed whereby at least one additional dimension may be added to the image the sensor is able to form of the object.

10. An optical sensor as claimed in claim 8 including scanning means for scanning the image produced by the light source relative to the object being sensed whereby at least one additional dimension may be added to the image the sensor is able to form of the object.

11. An optical sensor as claimed in claim 2 in which the pattern of light and dark areas comprises light and dark bands.

12. An optical sensor as claimed in claim 2 in which the pattern of light and dark areas comprises a checker-board pattern.

13. An optical sensor as claimed in claim 4 in which n=2.

14. An optical sensor as claimed in claim 8 in which the structured point detector is in the form of a quadrant sensor and the correspondingly structured point source is in the form of a two-by-two checker-board pattern.

15. An optical sensor as claimed in claim 8 in which the structured point detector is in the form of a two element sensor and the correspondingly structured point source is in the form of a two element pattern.

16. A method of determining the range of at least part of an object being viewed using an optical sensor comprising: a structured light source which produces a pattern of contrasting areas; a detector which comprises an array of detector elements having dimensions matched to the pattern produced by the light source; an optical system which projects a primary image of the light source onto an object that is to be sensed and forms a secondary image on the detector of the primary image thus formed on the object; adjustment means which adjusts at least part of the optical system to vary the focussing of the primary image on the object such that when the primary image is in focus on the object, the secondary image on the detector is also in focus; and processing means which analyzes signals produced by the detector in conjunction with information on the adjustment of the optical system; said method including the steps of:

(a) adjusting the structured light source to interchange the positions of contrasting areas of the pattern produced by the light source;

(b) analyzing the secondary images received by the detector elements with the contrasting areas in the interchanged positions to determine those parts of the secondary images which are in focus on the detector; and (c) determining the range of corresponding parts of the object which are thus in focus.

* * * * *

UNITED STATES PATENT AND TRADEMARK OFFICE
CERTIFICATE OF CORRECTION

PATENT NO. : 5,381,236
DATED : January 10, 1995
INVENTOR : Colin G. Morgan

It is certified that error appears in the above-indentified patent and that said Letters Patent is hereby corrected as shown below:

Column 2 Line 62 begin new paragraph with "FIGS. 4, 5 and 6".

Column 5 Line 6 "CCd" should read --CCD--.

Column 6 Line 17 "i2 and i2" should read --i1 and i2--.

Column 6 Line 58 "IF 13" should read --IF i3--.

Column 6 Line 59 "/13" should read --/i3--.

Column 9 Line 55 after "identical" insert --,--.

Column 10 Line 68 "passed" should read --past--.

Column 11 Line 58 "fin" should read --finder.--.

Signed and Sealed this

Fourth Day of April, 1995

Attest:

BRUCE LEHMAN

Attesting Officer          Commissioner of Patents and Trademarks